UNITED STATES PATENT OFFICE.

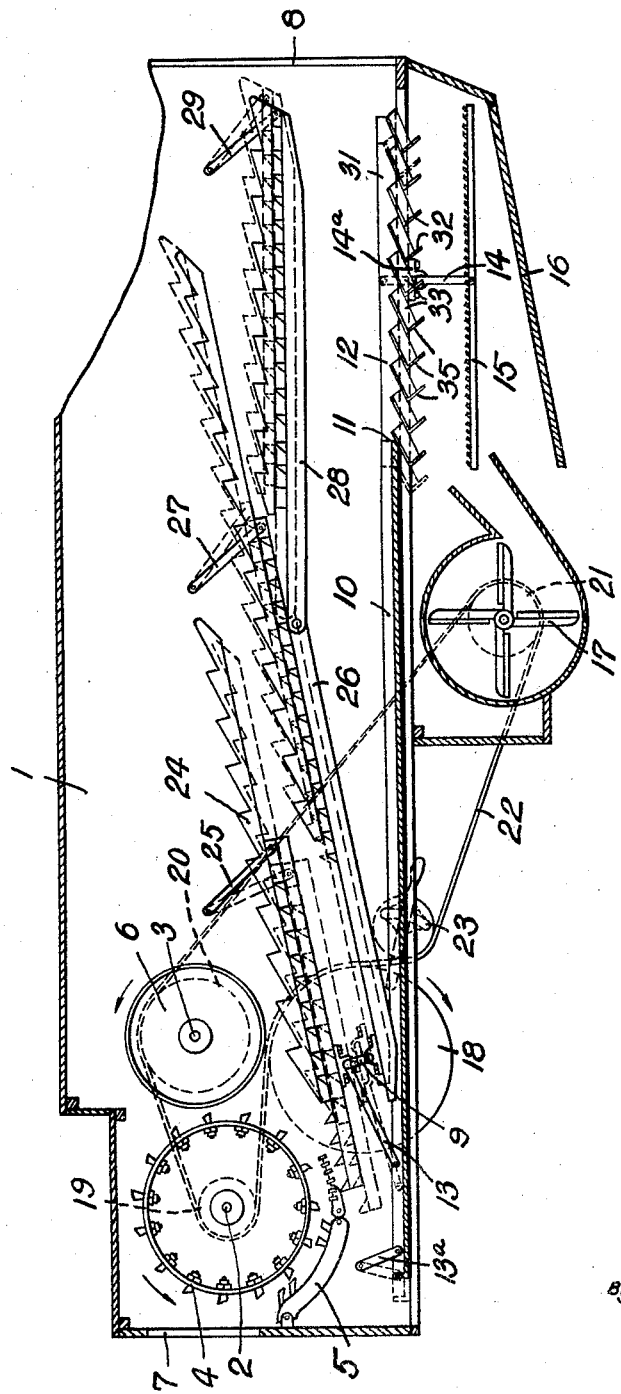

AMÉDÉE DION AND BRUNO DION, OF STE-THÉRÈSE DE BLAINVILLE, QUEBEC, CANADA.

THRESHING-MACHINE.

1,397,727. Specification of Letters Patent. Patented Nov. 22, 1921.

Application filed May 10, 1920. Serial No. 380,185.

*To all whom it may concern:*

Be it known that we, AMÉDÉE DION and BRUNO DION, British subjects, residing at Ste-Thérèse de Blainville, in the Province of Quebec, in the Dominion of Canada, have invented certain new and useful Improvements in Threshing-Machines; and we do hereby declare that the following is a full, clear, and exact description of the same.

The present invention relates to improvements in "threshing machines," and the main object of this invention is to eliminate the choking of the chaffer by straw.

The other objects of the invention will be clearly seen from the following description and accompanying drawings, which which form part of the present application in which:—

The figure is a side elevation of the machine complete, the side boards having been removed.

Like numerals of reference indicate corresponding parts in the figure.

In the drawings, 1 is the frame and casing in which are suitably journaled the shafts 2 and 3, and 4 is the cylinder mounted on the shaft 2 which co-acts with the concave 5, which parts are shown in order to illustrate their relation to the straw racks, although the details of construction of such parts are not claimed as part of the present invention.

On the shaft 3 is mounted the straw beater 6 which is preferably located slightly above the straw racks. The casing 1 is also provided with an opening 7 at one end thereof through which the grain enters and 8 is an opening at the opposite end for the straw to come out.

Preferably below the beater 6, is journaled in the frame 1, the crank shaft 9, and 10 is a one piece grain pan provided below the straw racks, said pan being provided at one end thereof with an opening 11 in which is secured the chaffer 12. The pan 10 is longitudinally movable in said casing 1 and is oscillated by the connecting rods 13 which are connected to the crank shaft 9, and is supported in said casing 1 by the links 13ª at one end and at its outer end by the links 14 which extend below said pan and are fulcrumed intermediate at their length to the bracket 14ª and to which is secured at their lower ends the movable sieve 15. Below said sieve 15 is preferably provided a member 16 which is so inclined as to direct the grain to a worm, (not illustrated in the drawings) which carries the grain to the sacks.

Adjacent said sieves 15 and 16 is provided the usual fan 17 which is suitably mounted in the frame 1.

On the crank shaft 9 is mounted the pulley 18 and shafts 2 and 3 are provided with pulleys 19 and 20 respectively. The fan 17 is also provided with a pulley 21 and 22 is a belt which passes over the pulleys 18, 19, 20 and 21, actuating them simultaneously. Intermediate of said belt is provided the belt tightener 23.

Suitably mounted above and on said crank shaft 9 is a straw rack 24, said rack preferably extending below the concave 5 and is maintained in an inclined position by the pivoted links 25. The links 25 are preferably mounted practically in the middle of said rack, thereby giving said rack a slight rotating movement when operated by the crank shaft 9, which retards the straw and provides for a better threshing. The movement obtained is practically elliptical and so shakes the straw thoroughly.

Below said crank shaft 9 and mounted thereon is the inclined straw rack 26 which preferably extends outwardly and beyond the rack 24, said rack being also supported by pivoted links 27. The movement of this rack, on account of the disposition of the links 27 will be relatively higher or more oblique than that of the former rack, thus slightly retarding the straw from leaving said rack. Pivotally mounted on said rack 26 is a horizontal rack 28 which is operated simultaneously by said rack 26 and is pivotally supported at its outer end to the links 29. The movement imparted to the rack will be horizontal. The object of this rack is to thresh the short straws before leaving the machine, and thus thresh any remaining grain in said straw that is dropped directly on the chaffer 12.

The straw rack 24 and the straw rack 26 being arranged in overlapping relation insure a continuous and uninterrupted feed of the straw toward the rear of the machine, while shaking the straw to cause the grain to fall to the grain pan 10. As the straw is shaken by the two inclined racks the shorter straws approach the bottom and finally while on the rack 26 fall therethrough toward the chaffer. But, these shorter straws do not fall upon the chaffer; they are caught upon the third rack 28 which is horizontally disposed beneath the rack 26. Upon falling upon the horizontal rack 28 the short straws are further agitated to cause the grain contained therein to fall toward the chaffer. The provision of the horizontal rack 28 to catch the shorter straws which fall through the rack 26 is advantageous in that by its provision the short straws are prevented from falling upon the chaffer which would tend to choke the same or at least impede its operation. By pivoting one end of the horizontal rack on the second inclined rack, the proper reciprocation of the horizontal rack is insured without providing special connections from the shaft 9. It will be evident that even the long straws will fall upon the horizontal rack just before they are expelled from the machine, but this takes place very close to the end of the machine and consequently the long straws in falling from the second inclined rack will just engage the horizontal rack and will be immediately discharged from the machine.

As above pointed out, the horizontal rack 28 prevents the shorter straws from falling upon the chaffer, but this in itself, while improving the action of the machine, does not prevent the extremely short straws or pieces of straw from falling upon the chaffer and choking the same because they may accidentally fall through the rack 28. However, the fan 17 will prevent the extremely short straws or pieces of straw from falling upon the chaffer since its blast is directed upwardly and obliquely of said chaffer. This is not the only function of this fan; it also serves to blow the chaff and dust from the grain while the latter is falling to and resting upon the movable sieve. This double function of the fan is made possible by the particular arrangement whereby its blast is directed upwardly and obliquely of the chaffer and sieve.

What we claim as our invention is:—

1. In a threshing machine, the combination of a beater; an inclined straw rack at one end extending beneath and close to the beater, and at the other end extending upwardly and away from the beater; a second inclined straw rack having a substantial portion thereof extending beneath and close to the first named straw rack so that said racks overlap, and having its other end extending away from said first named straw rack toward the end of the machine; and a third straw rack mounted to extend horizontally of the machine and to extend beneath the second straw rack for a substantial distance, said third straw rack being pivotally mounted at one end to the second straw rack to be reciprocated thereby.

2. In a threshing machine, the combination of a frame; a beater; two inclined and overlapping straw racks mounted in said frame for reciprocatory movement; a chaffer mounted at the discharge side of said frame; and a horizontal movable rack mounted directly above said chaffer and connected to be operated with and by one of said two inclined racks, said horizontal rack being adapted to receive the shorter straws from the inclined racks and remove from said shorter straws the grains remaining therein.

3. In a threshing machine, the combination of a frame; a beater; a pair of inclined and overlapping straw racks mounted in said frame for reciprocatory movement; a horizontal straw rack underlying one of said inclined racks and mounted in the frame for reciprocatory movement; a chaffer mounted at the discharge side of said frame directly beneath said horizontal rack; a movable sieve mounted directly beneath said chaffer; and a blower having its blast of air directed upwardly toward and obliquely of said chaffer and said sieve whereby chaff and dust is blown from the grain which passes through said chaffer to said sieve and whereby short pieces of straw which fall through the horizontal racks to the chaffer are blown therefrom.

Signed at Montreal, Quebec, Canada, this 15th day of April, 1920.

AMÉDÉE DION.
BRUNO DION.

Witnesses:
J. D. GILIATRAULT,
C. PATENAUDE.